US012783163B2

(12) United States Patent
Zhang et al.

(10) Patent No.: US 12,783,163 B2
(45) Date of Patent: Nov. 3, 2026

(54) METHOD, SYSTEM, AND APPARATUS OF WRITING DATA, AND QUAD-LEVEL CELL NAND

(71) Applicant: SUZHOU METABRAIN INTELLIGENT TECHNOLOGY CO., LTD., Suzhou (CN)

(72) Inventors: Hailun Zhang, Suzhou (CN); Long Zhao, Suzhou (CN); Wenzheng Qin, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/138,602

(22) PCT Filed: Nov. 22, 2024

(86) PCT No.: PCT/CN2024/133829

§ 371 (c)(1),
(2) Date: Jun. 12, 2025

(87) PCT Pub. No.: WO2025/108425

PCT Pub. Date: May 30, 2025

(65) Prior Publication Data

US 2026/0202985 A1 Jul. 16, 2026

(30) Foreign Application Priority Data

Nov. 22, 2023 (CN) ......................... 202311559817.8

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0614; G06F 9/5011;
(Continued)

(56) References Cited

U.S. PATENT DOCUMENTS

2005/0005191 A1 1/2005 David
2021/0286554 A1* 9/2021 Gorobets ................ G11C 11/56
(Continued)

FOREIGN PATENT DOCUMENTS

CN 103488432 A 1/2014
CN 106776146 A 5/2017
(Continued)

OTHER PUBLICATIONS

The first search report of CN application No. 202311559817.8 issued on Dec. 20, 2023.
(Continued)

*Primary Examiner* — Tracy C Chan
(74) *Attorney, Agent, or Firm* — Scully, Scott, Murphy & Presser, P.C.

(57) ABSTRACT

The present application discloses a method, system, and apparatus of writing data, a non-volatile readable storage medium, and a quad-level cell NAND. A second storage module independent of a first storage module is provided; a first parity block obtained at a first time of writing to the target word line is stored into a target storage space; at a second time of writing to the target word line, the first parity block is called, and the first parity block and a data block that is written for the second time are transmitted to the target word line. The present application transfers data storage from the first storage module into the second storage module. In addition, during a second writing operation, a parity
(Continued)

block is no longer computed, but a parity block that is stored into the second storage module during a first writing operation is directly used.

20 Claims, 4 Drawing Sheets

(58) Field of Classification Search
CPC . G06F 11/1008; G11C 11/56; G11C 11/5621; G11C 11/5628; G11C 16/10; G11C 16/34; G11C 16/0483; G11C 29/52; G11C 29/04
See application file for complete search history.

(56) References Cited

U.S. PATENT DOCUMENTS

| | | | | |
|---|---|---|---|---|
| 2022/0206710 | A1* | 6/2022 | Alrod | G06F 11/108 |
| 2022/0310158 | A1* | 9/2022 | Xu | G11C 11/5628 |

FOREIGN PATENT DOCUMENTS

| | | | |
|---|---|---|---|
| CN | 109725845 | A | 5/2019 |
| CN | 112463040 | A | 3/2021 |
| CN | 112559385 | A | 3/2021 |
| CN | 113535460 | A | 10/2021 |
| CN | 113590227 | A | 11/2021 |
| CN | 114546707 | A | 5/2022 |
| CN | 114651241 | A | 6/2022 |
| CN | 115552532 | A | 12/2022 |
| CN | 116107797 | A | 5/2023 |
| CN | 116136743 | A | 5/2023 |
| CN | 116401063 | A | 7/2023 |
| CN | 116841794 | A | 10/2023 |
| CN | 117289876 | A | 12/2023 |
| EP | 0304348 | A2 | 2/1989 |

OTHER PUBLICATIONS

The search report of PCT application No. PCT/CN2024/133829 issue on Feb. 11, 2025.
The second search report of CN application No. 202311559817.8 issued on Jan. 16, 2024.

* cited by examiner

| Level | Word Line (WL) | First time of writing | Second time of writing |
|---|---|---|---|
| 0 | 0 | 1 | 6 |
| | 1 | 2 | 8 |
| | 2 | 3 | 10 |
| | 3 | 4 | 12 |
| 1 | 4 | 5 | 14 |
| | 5 | 7 | 16 |
| | 6 | 9 | 18 |
| | 7 | 11 | 20 |
| | ⋮ | ⋮ | ⋮ |
| 110 | 440 | 877 | 886 |
| | 441 | 879 | 888 |
| | 442 | 881 | 890 |
| | 443 | 883 | 892 |
| 111 | 444 | 885 | 893 |
| | 445 | 887 | 894 |
| | 446 | 889 | 895 |
| | 447 | 891 | 896 |

Fig. 1

METHOD, SYSTEM, AND APPARATUS OF WRITING DATA, AND QUAD-LEVEL CELL NAND

CROSS-REFERENCE TO RELATED APPLICATIONS

This application is a national stage entry of PCT International Application No. PCT PCT/CN/2024/133829, filed on Nov. 22, 2024, which claims priority to Chinese Patent Application No. 202311559817.8, entitled "METHOD, SYSTEM, AND APPARATUS OF WRITING DATA, AND QUAD-LEVEL CELL NAND", filed with the China National Intellectual Property Administration on Nov. 22, 2023, the disclosures of which are incorporated herein by reference in its entirety.

TECHNICAL FIELD

Embodiments of the present application relate to the field of data storage, and in particular, to a method, system, and apparatus of data writing, a non-volatile readable storage medium, and a quad-level cell NAND.

BACKGROUND

With the continuous development of NAND (Not AND) technology, a quad-level cell NAND (QLC NAND) has lower costs and greater storage capacity compared with a current mainstream triple-level cell NAND (TLC NAND). Each storage cell of the QLC NAND can store 4 bits of data.

However, there are some special requirements and challenges in a process of using the QLC NAND for a writing operation. In order to ensure the integrity and correctness of data, each word line needs to be written in two steps. In addition, in the process of writing in two steps, it is necessary to strictly follow a writing order between word lines. An order requirement is as follows: first writing of data is firstly performed on word lines in each level in sequence according to a hierarchy order, after the first writing of data has been performed on all the word lines of the level, second writing of data can continue to be performed.

Optionally, during the first writing of data, a computation module needs to be called. The computation module includes a processor for computation, and the processor includes a random access memory (RAM) for storing data. The processor computes a parity block according to written data, and the RAM is configured to store intermediate data and final data during the computation. After the computation is completed, the data and the parity block are written into a NAND, and then the RAM is released. During the second writing of data, the computation module is called again to perform the above computation step. As can be seen that, in order to write data into each word line, the computation module needs to be called twice, and RAM resources need to be occupied twice, but the RAM resources are limited. Therefore, it is necessary to provide a method of writing data to reduce occupancy on the RAM resources.

SUMMARY

The present application aims to provide a method, system, and apparatus of data writing, and a non-volatile readable storage medium, and a quad-level cell NAND. Data storage is transferred from a first storage module into a second storage module independent of the first storage module, thereby avoiding that two writing operations simultaneously occupy resources of the first storage module, which can improve performance and expansion capability of a system and ensure integrity and correctness of data. In addition, during a second writing operation, a parity block is no longer computed, but a parity block that is stored into the second storage module during a first writing operation is directly used. This saves occupancy on a processor and occupancy on the storage modules in the processor.

In order to solve the above technical problems, a first aspect of the embodiments of the present application provides a method of data writing, applied to a processor, wherein the processor includes a first storage module and a second storage module; the processor is configured to write data into a quad-level cell NAND; and the method includes:

applying for a target storage space from the second storage module when the quad-level cell NAND is powered on, the second storage module being a storage module independent of the first storage module;

computing a first parity block according to a data block that is written for a first time, transmitting the first parity block and the data block to a target word line, and storing the first parity block into the target storage space, at a first time of writing to the target word line; and calling the first parity block in the target storage space, and transmitting the first parity block and a data block that is written for a second time to the target word line, at a second time of writing to the target word line.

In an embodiment, when the processor is configured to process N writing operations concurrently, N is an integer greater than 2, the method further includes:

dividing computation resources of the processor into N parts, and setting a corresponding sequence identifier for each part of the computation resources; and the applying for a target storage space from the second storage module when the quad-level cell NAND is powered on includes:

applying for N target storage spaces from the second storage module when the quad-level cell NAND is powered on; and binding the N target storage spaces to the N parts of the computation resources in a one-to-one correspondence.

In an embodiment, the method further includes:

obtaining a writing instruction, and determining, according to the writing instruction, whether it is the first time of writing to the target word line or it is the second time of writing to the target word line;

if it is determined that it is the first time of writing to the target word line, proceeding to a step of the computing a first parity block according to a data block that is written for a first time, transmitting the first parity block and the data block that is written for the first time to a target word line, and storing the first parity block into the target storage space, at a first time of writing to the target word line; and if it is determined that it is the second time of writing to the target word line, proceeding to a step of the calling the first parity block in the target storage space, and transmitting the first parity block and a data block that is written for a second time to the target word line, at a second time of writing to the target word line.

In an embodiment, the computing a first parity block according to a data block that is written for a first time, transmitting the first parity block and the data block that is written for the first time to a target word line, and storing the first parity block into the target storage space, at a first time of writing to the target word line, includes:

determining a target sequence identifier and the target storage space corresponding to the target sequence identifier according to the writing instruction;

applying for a target computation resource corresponding to the target sequence identifier, and setting a parity computation flag bit to an enable state;

computing the first parity block by using the target computation resource according to the data block that is written for the first time; and storing the first parity block into the target storage space corresponding to the target sequence identifier; or setting a parity computation flag bit to an enable state according to the writing instruction, applying for the target storage space and a target computation resource, computing the first parity block by using the target computation resource according to the data block that is written for the first time, and storing the first parity block into the target storage space.

In an embodiment, the calling the first parity block in the target storage space, and transmitting the first parity block and a data block that is written for a second time to the target word line, at a second time of writing to the target word line, includes:

determining a target sequence identifier and the target storage space corresponding to the target sequence identifier according to the writing instruction, and setting a parity computation flag bit to a disable state;

reading the first parity block from the target storage space corresponding to the target sequence identifier; and transmitting the first parity block and the data block that is written for the second time to the target word line.

In an embodiment, the method further includes:

Determining, at the first time of writing to the target word line, whether a process of storing the first parity block into the target storage space corresponding to the target sequence identifier is completed; and releasing the target sequence identifier if it is determined that the process of storing the first parity block into the target storage space corresponding to the target sequence identifier is completed.

In an embodiment, the releasing the target sequence identifier includes:

marking the target sequence identifier as an unallocated state.

In an embodiment, the determining a target sequence identifier and a target storage space corresponding to the target sequence identifier according to the writing instruction includes:

determining a target sequence identifier that is unoccupied and a target address of the target storage space corresponding to the target sequence identifier according to the writing instruction.

In an embodiment, the calling the first parity block in the target storage space, and transmitting the first parity block and a data block that is written for a second time to the target word line, at a second time of writing to the target word line, includes:

determining a target sequence identifier and the target storage space corresponding to the target sequence identifier according to the writing instruction;

applying for a target computation resource corresponding to the target sequence identifier, and setting a parity computation flag bit to an enable state;

computing a second parity block by using the target computation resource according to the data block that is written for the second time;

reading the first parity block from the target storage space corresponding to the target sequence identifier; and transmitting the first parity block or the second parity block, and the data block that is written for the second time to the target word line.

In an embodiment, the transmitting the first parity block or the second parity block, and the data block that is written for the second time to the target word line includes:

determining a target parity block in a preset manner according to the first parity block and the second parity block, and transmitting the data block that is written for the second time and the target parity block to the target word line.

In an embodiment, the determining a target parity block in a preset manner according to the first parity block and the second parity block, and transmitting the data block that is written for the second time and the target parity block to the target word line includes:

determining the target parity block according to a comparison result between data bits in the first parity block and data bits in the second parity block, and transmitting the data block that is written for the second time and the target parity block to the target word line.

In an embodiment, the determining the target parity block according to a comparison result between data bits in the first parity block and data bits in the second parity block, and transmitting the data block that is written for the second time and the target parity block to the target word line determining a parity block with a correct computation result according to the data bits in the first parity block and the data bits in the second parity block, and transmitting the parity block with the correct computation result and the data block that is written for the second time to the target word line.

In an embodiment, before the determining a parity block with a correct computation result according to the data bits in the first parity block and the data bits in the second parity block, and transmitting the parity block with the correct computation result and the data block that is written for the second time to the target word line, the method further includes:

determining whether the first parity block is the same as the second parity block;

if it is determined that the first parity block is the same as the second parity block, transmitting the data block that is written for the second time, and any one of the first parity block and the second parity block to the target word line; and if it is determined that the first parity block is not the same as the second parity block, proceeding a step of the determining a parity block with a correct computation result according to the data bits in the first parity block and the data bits in the second parity block, and transmitting the parity block with the correct computation result and the data block that is written for the second time to the target word line.

In an embodiment, after the determining a parity block with a correct computation result according to the data bits in the first parity block and the data bits in the second parity block, the method further includes:

if both the first parity block and the second parity block are incorrect parity blocks, feeding back computation error information.

In an embodiment, after the feeding back computation error information, the method further includes:

marking a space, which stores the first parity block, in the target storage space, as invalid and clearing the space out; or when a preset condition is satisfied, writing a data block into the target word line, to compute a third parity block according to the data block currently written, and transmitting the third parity block and the data block to the target word line.

In an embodiment, after the feeding back computation error information, the method further includes:

when a preset condition is satisfied, writing the data block into the target word line, to compute a third parity block according to the data block currently written, and transmitting the third parity block and the data block to the target word line.

In an embodiment, after the calling the first parity block in the target storage space, and transmitting the first parity block and a data block that is written for a second time to the target word line, at a second time of writing to the target word line, the method further includes:

releasing the space, which stores the first parity block, in the target storage space.

In an embodiment, the releasing the space, which stores the first parity block, in the target storage space includes:

marking the space, which stores the first parity block, in the target storage space, as invalid and clearing the space out.

In an embodiment, before the releasing the space, which stores the first parity block, in the target storage space, the method further includes:

determining whether transmission completion information fed back by the target word line is received; and if the transmission completion information is received, proceeding to a step of releasing the space, which stores the first parity block, in the target storage space.

In an embodiment, the computing a first parity block according to a data block that is written for a first time, transmitting the first parity block and the data block that is written for the first time to a target word line, and storing the first parity block into the target storage space includes:

setting a parity computation flag bit into an enable state according to the writing instruction, applying for the target storage space and a target computation resource, computing the first parity block by using the target computation resource according to the data block that is written for the first time, and storing the first parity block into the target storage space.

In an embodiment, the calling the first parity block in the target storage space, and transmitting the first parity block and a data block that is written for a second time to the target word line, includes:

setting a parity computation flag bit to a disable state according to the writing instruction, reading the first parity block from the target storage space, and transmitting the first parity block and the data block that is written for the second time to the target word line.

In order to solve the above technical problems, a second aspect of the embodiments of the present application provides a system of writing data, applied to a processor, wherein the processor includes a first storage module and a second storage module; the processor is configured to write data into a quad-level cell NAND; and the system includes:

a space application unit, configured to apply for a target storage space from the second storage module when the quad-level cell NAND is powered on, wherein the second storage module is a storage module independent of the first storage module;

a first writing unit, configured to: compute a first parity block according to a data block that is written for a first time, transmit the first parity block and the data block that is written for the first time to a target word line, and store the first parity block into the target storage space, at a first time of writing to the target word line; and a second writing unit, configured to: call the first parity block in the target storage space, and transmit the first parity block and a data block that is written for a second time to the target word line, at a second time of writing to the target word line.

In order to solve the above technical problems, a third aspect of the embodiments of the present application provides an apparatus of writing data, including:

a memory, configured to store a computer program; and a processor, configured to implement, when executing the computer program, steps of the method of writing data as described above.

In order to solve the above technical problems, a fourth aspect of the embodiments of the present application provides a non-volatile computer-readable storage medium, having a computer program stored thereon, wherein the computer program, when executed by a processor, implements steps of the method of writing data as described above.

In order to solve the above technical problems, a fifth aspect of the embodiments of the present application provides a quad-level cell NAND. A processor includes a first storage module and a second storage module. The processor of the apparatus of writing data is configured to write data into the quad-level cell NAND.

The present application provides a method, system, and apparatus of writing data, a non-volatile readable storage medium, and a quad-level cell NAND, relates to the field of data processing, and aims to solve the problem of occupancy on excessive resources. The second storage module independent of the first storage module is provided; a first parity block obtained at a first time of writing to the target word line is stored into a target storage space; and at a second time of writing to the target word line, the first parity block is called, and the first parity block and a data block that is written for the second time are transmitted to the target word line. The present application transfers data storage from the first storage module into the second storage module independent of the first storage module, thereby avoiding that two writing operations simultaneously occupy resources of the first storage module, which can improve performance and expansion capability of a system and ensure integrity and correctness of data. In addition, during a second writing operation, a parity block is no longer computed, but a parity block that is stored into the second storage module during a first writing operation is directly used. This saves occupancy on a processor and occupancy on storage modules in the processor.

BRIEF DESCRIPTION OF THE DRAWINGS

For clearer descriptions of the technical solutions according to the embodiments of the present application, the drawings required to be used in the prior art and the embodiments are briefly introduced below. It is obvious that the drawings in the description below are only some rather than all embodiments of the present application, and it is obvious for those skilled in the art that other drawings can be acquired according to the drawings without creative efforts.

FIG. 1 is a schematic diagram of storage of a quad-level cell NAND according to the present application;

DETAILED DESCRIPTION OF THE EMBODIMENTS

The core idea of the present application is to provide a method, system, and apparatus of writing data, and a non-volatile readable storage medium, and a quad-level cell NAND. Data storage is transferred into a second storage module independent of a first storage module, thereby avoiding that two writing operations simultaneously occupy resources of the first storage module, which can improve performance and expansion capability of a system and ensure integrity and correctness of data. In addition, during a second writing operation, a parity block is no longer computed by calling a computation module, but a parity block stored into the second storage module during a first writing operation is directly used. This saves occupancy on the computation module.

In order to make the objectives, technical solutions, and advantages of the embodiments of the present application clearer, the technical solutions in the embodiments of the present application are clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without making creative efforts shall fall within the protection scope of the present application.

As shown in FIG. 1, which shows a quad-level cell NAND. An existing writing process is as follows: firstly, for level 0, a first data writing process is performed on word lines 0 to 3 in sequence; after a first time of writing to the word line 3 is completed, a second data writing process is performed on word lines 0 to 3 in sequence. After a second time of writing to the word line 3 is completed, four word lines in level 1 start to be written, and the above step is repeated.

Figure 2:
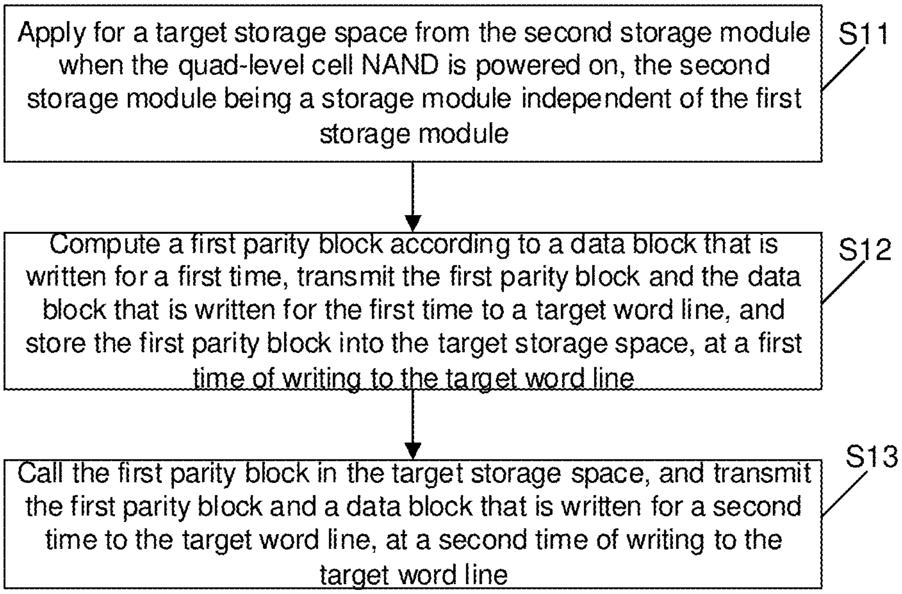
FIG. 2 is a flowchart of a method of writing data according to the present application.

The present application provides a method of writing data, as shown in FIG. 2, applied to a processor. The processor includes a first storage module and a second storage module. The processor is configured to write data into a quad-level cell NAND. The method includes:

S11: Apply for a target storage space from the second storage module when the quad-level cell NAND is powered on, the second storage module being a storage module independent of the first storage module.

In embodiments of the present application, when the quad-level cell NAND is powered on, the processor needs to apply for the target storage space from the second storage module. The second storage module in the processor is an independent storage device that can provide an additional storage space. Through the second storage module, a system can store data by using additional storage resources.

Optionally, the processor may transmit a request to the second storage module to request to allocate a target storage space. The target storage space is configured to store data to be written and related parity blocks. The second storage module may perform allocation according to the request and return an address or another identifier of the target storage space to the processor.

Through this step, the system can use independent storage space of the second storage module to store data, thereby avoiding simultaneous occupancy of resources of the first storage module and improving performance and expansion capability of the system.

S12: Compute a first parity block according to a data block that is written for the first time, transmit the first parity block and the data block that is written for the first time to a target word line, and store the first parity block into the target storage space, at a first time of writing to the target word line.

In embodiments of the present application, before the first time of writing to the target word line, the processor uses the data block as an input, and obtains the parity block by computation through an algorithm. This algorithm may involve error correction code, a hash function, and the like. The processor uses the first storage module (such as a random access memory (RAM) in the processor) to store an intermediate result during the computation and the finally generated first parity block. The first parity block obtained by computation and the data block may be transmitted to the target word line, and the first parity block is stored into the target storage space at the same time. In this way, after the first time of writing to the target word line is completed, the target word line includes both the data block and the corresponding first parity block.

S13: Call the first parity block in the target storage space, and transmit the first parity block and a data block that is written for a second time to the target word line, at a second time of writing to the target word line.

In this step, the first parity block in the target storage space needs to be called when data is written into the target word line for the second time, and the first parity block and the data block that is written for the second time are transmitted to the target word line, to ensure the integrity and correctness of data.

Firstly, the first parity block in the target storage space needs to be called. The parity block is obtained through computation of a computation module according to the data block that is written for the first time. The parity block is stored into the second storage module independent of the first storage module. By calling the first parity block in the target storage space, a value of this parity block may be obtained. Next, the obtained first parity block and the data block that is written for the second time may be transmitted to the target word line. The target word line means a specific position into which data is written. Through this process, the integrity and correctness of the data can be ensured. The value of the first parity block may be configured to verify whether the data block that is written for the second time is correct, thereby ensuring that the data is correctly written into the target word line.

The method provided in embodiments of the present application avoids a step of repeatedly computing a parity block because the parity block has been computed and stored in the first writing operation. This can save occupancy on resources of the computation module. Meanwhile, it may be possible to avoid a situation that two writing operations simultaneously occupy resources of the first storage module by storing data into the independent second storage module, so as to improve performance and expansion capability of a system.

In an embodiment, when the processor is configured to process N writing operations concurrently, N is an integer greater than 2, the method further includes:

dividing computation resources of the processor into N parts, and setting a corresponding sequence identifier for each part of the computation resources.

The applying for a target storage space from the second storage module when the quad-level cell NAND is powered on includes:

applying for N target storage spaces from the second storage module when the quad-level cell NAND is powered on; and binding the N target storage spaces to the N parts of computation resources in a one-to-one correspondence.

In embodiments of the present application, when the processor needs to simultaneously perform a plurality of writing operations, for example, N writing requests, a computing task may be allocated to the N parts of computation resources and allocate one target storage space for each writing request. Each target storage space is bound to its corresponding computation resource to ensure consistency and correctness of data during concurrent processing.

By dividing the computation resources into N parts and binding the N parts to the N target storage spaces, the processor may achieve an efficient concurrent processing capability. In this way, during the processing of the plurality of writing requests, each request can be processed in an independent target storage space, without interfering or conflicting with each other. This improves the working efficiency of the processor and the overall performance of the system.

It should be noted that the computation resources may be used for, but not limited to, computing (e.g. encrypting and converting) data that is not allowed to be written to a quad-level cell NAND, so that computed data may be written into the quad-level cell NAND. The computation resources may include, but not limited to, hardware resources and computing power resources that are provided by the processor. For example, the hardware resources may include, but not limited to, hardware for performing operations in the processor. For example, the hardware resources may include, but not limited to, an XOR (exclusive OR) computation unit in the processor. The computing power resources may include, but not limited to, operation performance provided by the processor. In an example in which the processor includes a central processing unit (CPU), the computing power resources may include, but not limited to, operation performance provided by the CPU, such as operation performance of executing logical operation and bit operation provided by the CPU.

In an embodiment, the method further includes:

obtaining a writing instruction, and determining, according to the writing instruction, whether it is the first time of writing to the target word line or it is the second time of writing to the target word line;

if it is determined that it is the first time of writing to the target word line, proceeding to a step of the computing a first parity block according to a data block that is written for a first time, transmitting the first parity block and the data block that is written for the first time to the target word line, and storing the first parity block into the target storage space, at a first time of writing to the target word line; and if it is determined that it is the second time of writing to the target word line, proceeding to a step of the calling the first parity block in the target storage space, and transmitting the first parity block and a data block that is written for a second time to the target word line, at a second time of writing to the target word line.

In an embodiment, the computing a first parity block according to a data block that is written for the first time, transmitting the first parity block and the data block that is written for the first time to a target word line, and storing the first parity block into the target storage space, at a first time of writing to the target word line, includes:

determining a target sequence identifier and the target storage space corresponding to the target sequence identifier according to the writing instruction;

applying for a target computation resource corresponding to the target sequence identifier, and setting a parity computation flag bit to an enable state;

computing the first parity block by using the target computation resource according to the data block that is written for the first time; and storing the first parity block into the target storage space corresponding to the target sequence identifier.

In embodiments of the present application, before data is written into the target word line, it needs to obtain a writing instruction, and determine, according to the writing instruction, whether it is the first time of writing to the target word line or it is the second time of writing to the target word line.

If it is determined that it is the first time of writing to the target word line, the first parity block is computed according to the data block that is written for the first time, the first parity block and the data block are transmitted to the target word line, and the first parity block is stored into the target storage space. For example, the step includes: determining a target sequence identifier and a target storage space corresponding to the target sequence identifier according to the writing instruction; applying for a target computation resource corresponding to the target sequence identifier, and setting a parity computation flag bit to an enable state, which means that a step of computing a parity bit needs to be executed; computing the first parity block by using the target computation resource according to the data block that is written for the first time; and storing the first parity block into the target storage space corresponding to the target sequence identifier.

The above step ensures that the first parity block is stored into the target storage space during the first writing. In this way, at the second time of writing to the target word line, the first parity block in the target storage space may be called, and the first parity block and the data block that is written for the second time may be transmitted to the target word line. This design may improve efficiency and reliability of writing data.

In an embodiment, the calling the first parity block in the target storage space, and transmitting the first parity block and the data block that is written for the second time to the target word line, at a second time of writing to the target word line, includes:

determining a target sequence identifier and a target storage space corresponding to the target sequence identifier according to the writing instruction;

setting a parity computation flag bit to a disable state;

reading the first parity block from the target storage space corresponding to the target sequence identifier; and transmitting the first parity block and the data block that is written for the second time to the target word line.

In embodiments of the present application, the determining a target sequence identifier and a target storage space corresponding to the target sequence identifier according to the writing instruction means that the target storage space to be accessed may be determined according to the target sequence identifier in the writing instruction. The setting a parity computation flag bit to a disable state means that there is no need to execute the step of computing a parity bit. Correspondingly, the target computation resource corresponding to the target sequence identifier may be set to an inactive or unused state, so that the target computation resource is not called. Then, data is directly read from the first parity block that is previously written into the target storage space, and the first parity block and the data block that is written for the second time are transmitted to the target word line together for a subsequent processing or storage operation.

By performing the above operations, the first parity block in the target storage space may be called at a second time of writing to the target word line, the target computation resource is no longer called to compute the parity block again during the second time of writing, and the first parity block and the data block that is written for the second time are transmitted to the target word line. This may achieve an efficient data writing operation between the processor and the quad-level cell NAND, thereby reducing occupancy on the first storage module and the target computation resource.

In an embodiment, the method further includes:

determining, at the first time of writing to the target word line, whether a process of storing the first parity block into the target storage space corresponding to the target sequence identifier is completed; and releasing the target sequence identifier if it is determined that the process of storing the first parity block into the target storage space corresponding to the target sequence identifier is completed.

Embodiments of the present application ensures correct release of resources and correct setting of a state after the writing operation is completed, so as to facilitate correct execution of a next writing operation. By determining whether the storage process is completed, it can be determined that the data block and the parity block have been successfully written into the target storage space corresponding to the target sequence identifier. Only in this case, the target sequence identifier may be safely released for use in the next writing operation.

The purpose of this control measure is to ensure correct writing of data and correct use of processor resources. By determining whether the storage process is completed, it is possible to avoid performing the next writing operation when data is not written correctly, thereby avoiding data loss or an error. Meanwhile, by releasing the target sequence identifier, it can ensure that a new target storage space and a corresponding computation resource can be correctly applied for the next writing operation.

In an embodiment, the releasing the target sequence identifier includes:

marking the target sequence identifier as an unallocated state.

In this embodiment, the target sequence identifier is used for identifying a binding relationship between the target storage space and the target computation resource. When a certain writing operation is completed, releasing the target sequence identifier can ensure that the identifier can be reused in a subsequent writing operation, thereby improving efficiency and resource utilization rate of the system.

The step of releasing the target sequence identifier may include the following aspects:

Determining whether the process of storing the first parity block into the target storage space corresponding to the target sequence identifier is completed; this is to ensure correct writing and storage of data, so as to avoid data loss or error before releasing the target sequence identifier. If the process of storing data is completed, the target sequence identifier is released, which means that the identifier may be marked as an unallocated state and may be used again in the subsequent writing operation. By releasing the target sequence identifier, the system may continue to use the identifier to bind another target storage space to the target computation resource.

In conclusion, embodiments of the present application describe a method for releasing the target sequence identifier. This method ensures reusability of the target sequence identifier, to improve the efficiency and resource utilization rate of the system.

In an embodiment, the determining the target sequence identifier and the target storage space corresponding to the target sequence identifier according to the writing instruction includes:

determining a target sequence identifier that is unoccupied and a target address of the target storage space corresponding to the target sequence identifier according to the writing instruction.

In embodiments of the present application, by determining the target address of the target storage space, the first parity block is then stored into the target address. After receiving the writing instruction, the processor first needs to determine an available target sequence identifier and a corresponding target storage space. This can be achieved by checking occupancy states of all target sequence identifiers and all corresponding target storage spaces. If there is an available target sequence identifier and a corresponding target storage space, the available target sequence identifier and the corresponding target storage space may be allocated to the current writing operation.

A target sequence identifier is a unique number used for identifying a target storage space. It may be an integer, a character string, or an identifier of any another form. Selection of the target sequence identifier may be defined according to actual needs. For example, the target sequence identifier may be allocated in sequence or generated by using an algorithm.

The target storage space is a storage region for storing data and a parity block. Each target storage space has a corresponding target address for identifying a location of the storage space. The target address may be a physical address or a logical address, which may be used for locating the target storage space.

The purpose of embodiments of the present application is to allocate an available target sequence identifier and a corresponding target storage space in a writing operation. Through this allocation, it can ensure that each writing operation has an independent target storage space, thereby avoiding data confusion and conflicts. This can ensure data integrity and reliability of a writing operation, and improve efficiency and performance during the parallel processing of the processor. In an embodiment, the calling the first parity block in the target storage space, and transmitting the first parity block and a data block that is written for the second time to the target word line, at a second time of writing to the target word line, includes:

determining a target sequence identifier and the target storage space corresponding to the target sequence identifier according to the writing instruction;

applying for a target computation resource corresponding to the target sequence identifier, and setting a parity computation flag bit to an enable state;

computing a second parity block by using the target computation resource according to the data block that is written for the second time;

reading the first parity block from the target storage space corresponding to the target sequence identifier; and transmitting the first parity block or the second parity block, and the data block that is written for the second time to the target word line.

In this embodiment, when data is written into the target word line for the second time, the step of computing the parity block is executed again, to achieve efficient and reliable operations. Firstly, the target sequence identifier and the target storage space corresponding to the target sequence identifier are determined according to a writing instruction. Then, a target computation resource corresponding to the target sequence identifier is applied, and a parity computation flag bit is set to an enable state (which means that the step of computing a parity bit needs to be executed), so as to compute a second parity block by using the target computation resource according to the data block that is written for the second time. After computing the second parity block, the first parity block is read from the target storage space corresponding to the target sequence identifier. The first parity block or the second parity block, and the data block that is written for the second time are transmitted to the target word line. By computing the parity block twice, accuracy of written data may be improved.

In embodiments of the present application, the process of computing the parity block is performed during both writing operations on the target word line, although it occupies a part of computation resources, writing efficiency and data integrity of the processor are improved. In addition, since a computation result (a parity block) is stored into the second storage module of the processor, the method in embodiments of the present application may further reduce the occupancy on resources of the first storage module in the processor (e.g. a RAM in the processor).

In an embodiment, the transmitting the first parity block or the second parity block, and the data block that is written for the second time to the target word line includes:

determining a target parity block in a preset manner according to the first parity block and the second parity block, and transmitting the data block that is written for the second time and the target parity block to the target word line.

The purpose of embodiments of the present application is to transmit the first parity block or the second parity block, and the data block that is written for the second time to the target word line, and determine the target parity block in the preset manner. This preset manner may be a preset encryption algorithm, a checksum algorithm, or an error-correcting code algorithm. The data block that is written for the second time and the target parity block are transmitted to the target word line together for subsequent writing and verification operations.

In an embodiment, the determining a target parity block in a preset manner according to the first parity block and the second parity block, and transmitting the data block that is written for the second time and the target parity block to the target word line, includes:

determining the target parity block according to a comparison result between data bits in the first parity block and data bits in the second parity block, and transmitting the data block that is written for the second time and the target parity block to the target word line.

Optionally, the preset manner mentioned in the above embodiment may be to compare each data bit in the first parity block with a corresponding data bit in the second parity block to obtain a comparison result. The comparison result is used for determining the target parity block. The preset manner may be to use a logical operation (such as logical AND, logical OR, and logical XOR) to determine the target parity block. Finally, after the target parity block is determined, the data block that is written for the second time and the target parity block are transmitted to the target word line, thereby completing the operation of writing data to the target word line for the second time.

The advantage of this method is that, by comparing the first parity block with the second parity block and determining the target parity block according to the comparison result, it may be possible to improve reliability and integrity of data. By adopting the preset manner, when the target parity block is determined according to the comparison result, it may be possible to adapt to different needs and situations more flexibly.

In an embodiment, the determining the target parity block according to a comparison result between data bits in the first parity block and data bits in the second parity block, and transmitting the data block that is written for the second time and the target parity block to the target word line includes:

determining a parity block with a correct computation result according to the data bits in the first parity block and the data bits in the second parity block, and transmitting the parity block with the correct computation result and the data block that is written for the second time to the target word line.

Optionally, in embodiments of the present application, the parity block with the correct computation result is determined according to comparison between the data bits in the first parity block and the data bits in the second parity block, and the parity block with the correct computation result and the data block that is written for the second time are transmitted to the target word line. For example, if a data bit has a same value in the first parity block and the second parity block, this bit is considered to be correct.

This method can improve reliability and stability of data writing while ensuring correctness of a data block and a parity block that are transmitted in the target word line. By comparing the data bits to determine the correct parity block, it may be possible to avoid other complex computation processes, and simplify implementation of the method of writing data and the design of the processor.

In an embodiment, before the determining a parity block with a correct computation result according to the data bits in the first parity block and the data bits in the second parity block, and transmitting the parity block with the correct computation result and the data block that is written for the second time to the target word line, the method further includes:

determining whether the first parity block is the same as the second parity block;

if it is determined that the first parity block is the same as the second parity block, transmitting the data block that is written for the second time, and any one of the first parity block and the second parity block to the target word line; and if it is determined that the first parity block is not the same as the second parity block, proceeding to a step of the determining a parity block with a correct computation result according to the data bits in the first parity block and the data bits in the second parity block, and transmitting the parity block with the correct computation result and the data block that is written for the second time to the target word line.

Optionally, in embodiments of the present application, when determining whether the first parity block is the same as the second parity block, if it is determined that the first parity block is the same as the second parity block, the data block that is written for the second time, and any one of the first parity block and the second parity block are transmitted to the target word line. In this way, if the two parity blocks are the same, it means that the first parity block or the second parity block is already one of correct parity blocks, so the correct parity block may be directly transmitted to the target word line. If the two parity blocks are not the same, the parity block with a correct computation result needs to be determined according to the data bits in the first parity block and the data bits in the second parity block.

Optionally, the parity block with a correct computation result is determined according to the comparison result between the data bits in the first parity block and the data bits in the second parity block. If a data bit has a same value in the two parity blocks, the bit is considered to be correct, otherwise, the bit is considered to be incorrect. A value of the parity block with a correct computation result may be determined bit by bit according to the comparison result of the bits. The method in embodiments of the present application may effectively ensure the correctness and integrity of data, and improve the reliability of data writing.

In an embodiment, after the determining a parity block with a correct computation result according to the data bits in the first parity block and the data bits in the second parity block, the method further includes:

if both the first parity block and the second parity block are incorrect parity blocks, feeding back computation error information.

Optionally, if both the first parity block and the second parity block are determined to be incorrect parity blocks in the above embodiment, this means that there is a serious computation error in the data writing process. In this case, the step of feeding back computation error information is provided. This can be achieved by transmitting the computation error information to relevant processors or other system components. The computation error information may include relevant information such as an error type and an error location, to assist other components in fault diagnosis and correction.

In this way, in the writing process, computation errors can be timely recognized and processed, thereby improving the reliability of data writing.

In an embodiment, after the feeding back computation error information, the method further includes:

marking a space, which stores the first parity block, in the target storage space, as invalid and clearing the space out.

Optionally, in this embodiment, if both the first parity block and the second parity block are found to be incorrect parity blocks during computation, the system takes measures. Firstly, a storage space is marked as an invalid state according to a position of the first parity block in which an error occurs. This means that the system may consider that data in the storage space is unreliable and cannot be used anymore. Next, the system may clear out the data in the storage space. The purpose of this step is to completely erase incorrect data, so as to ensure that the storage space is cleared out and can be reused. In this way, the reliability and accuracy of data are ensured.

In an embodiment, after the feeding back computation error information, the method further when a preset condition is satisfied, writing a data block into the target word line, to compute a third parity block according to the data block currently written, and transmitting the third parity block and the data block to the target word line.

Optionally, after the system has detected the computation error information, a data block is written into the target word line when the preset condition is satisfied. The system may write the data block to the target word line again to compute the third parity block according to the data block currently written. The preset condition here may be within a period of time after a computation error occurs or after a specific processing is performed. By recomputing the third parity block and transmitting the third parity block and the data block to the target word line, the system may correct a previous error and ensure the integrity and accuracy of data.

In conclusion, this method may effectively handle with a computation error and fix the error by recomputing and transmitting the data block, thereby improving the reliability and accuracy of data writing.

In an embodiment, after the calling the first parity block in the target storage space, and transmitting the first parity block and a data block that is written for the second time to the target word line, at a second time of writing to the target word line, the method further includes:

releasing the space, which stores the first parity block, in the target storage space.

Optionally, after the target word line is written for the second time, the storage space for storing the first parity block may also be released. This can release more storage spaces for other data, improve efficiency of storage space utilization, and provide a more efficient and flexible data writing mode.

In an embodiment, the releasing the space, which stores the first parity block, in the target storage space, includes:

marking the space, which stores the first parity block, in the target storage space, as invalid and clearing the space out.

Optionally, the data in the space, which stores the first parity block, in the target storage space, is marked as invalid, which means that the data is no longer considered to be valid and cannot be accessed or used. The space, which stores the first parity block, in the target storage space, is cleared out, which means that data in the space is deleted, and the space is set to an initial state. Through this operation, the space, which stores the first parity block, in the target storage space, may be effectively released. This may reuse the space in subsequent data writing operations and improve the utilization rate of storage resources. In addition, by marking the data in this space as invalid, the risk of misreading or misusing the data may be lowered. The clearing operation ensures that the space does not contain any old data, thereby ensuring the accuracy and reliability of subsequent writing operations.

In an embodiment, before releasing the space, which stores the first parity block, in the target storage space, the method further includes:

determining whether transmission completion information fed back by the target word line is received; and if the transmission completion information is received, proceeding to a step of releasing the space, which stores the first parity block, in the target storage space.

Optionally, before releasing, it needs to determine whether the transmission completion information fed back by the target word line is received. This is to ensure that a previous data writing operation has been completed. If the transmission completion information is received, a next step is executed. If the transmission completion information is not received, it needs to wait or retry data writing, to ensure the integrity of data writing.

That is, once the transmission completion information is received, the step of releasing the space, which stores the first parity block, in the target storage space may be executed. The purpose of this step is to release the previous space for storing the first parity block, so that this space can be reused in next data writing.

Figure 3:
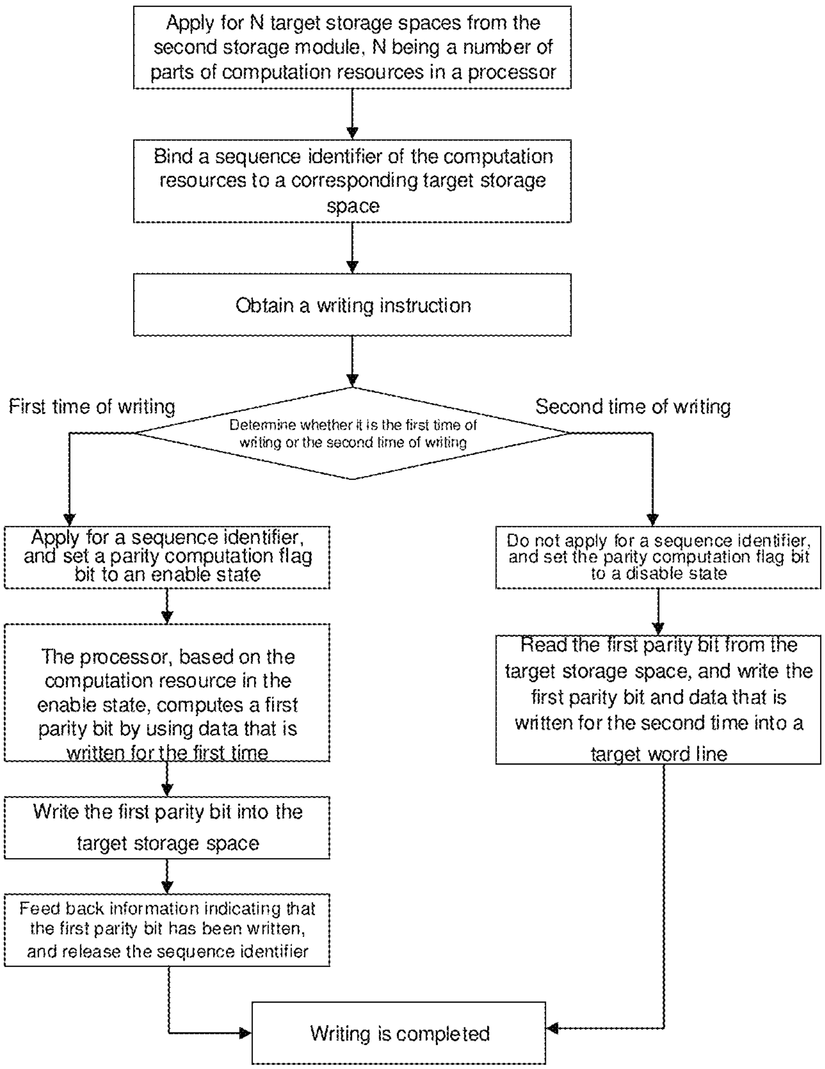
FIG. 3 is a schematic diagram of an optional embodiment of a method of writing data according to the present application.

As shown in FIG. 3, in an optional embodiment, the method of writing data includes the following steps:

first applying for N target storage spaces from a second storage module, N being a number of parts of computation resources in a processor; binding each sequence identifier of the computation resources to a corresponding target storage space; obtaining a writing instruction, and determining, according to the writing instruction, whether it is the first time of writing or it is the second time of writing; if it is the first time of writing, applying for a sequence identifier, and setting a parity computation flag bit to an enable state, so as to cause the processor, based on the parity computation flag bit in the enable state, to compute a first parity bit by using computation resource according to data that is written for the first time; writing the first parity bit into the target storage space; feeding back information indicating that the first parity bit has been written, and releasing the sequence identifier; if it is the second time of writing, not applying for a sequence identifier, and setting the parity computation flag bit to a disable state; reading the first parity bit from the target storage space; and writing the first parity bit and data that is written for the second time into the target word line.

In this application, by distinguishing the two writing processes, after the parity bit computation is performed for the first time, and the first parity bit is stored into the target storage space, there is no need to apply for a computation resource for parity bit computation during the writing for the second time. In this way, it saves resources of the first storage module in the processor and resources of the processor, and can release the first storage module faster, thereby increasing a write bandwidth and greatly helping to improve product performance.

In order to better understand the method of writing data in embodiments of the present application, the method of writing data in embodiments of the present application will be explained and described in combination with optional embodiments, which include but are not limited to, embodiments of the present application.

Figure 4:
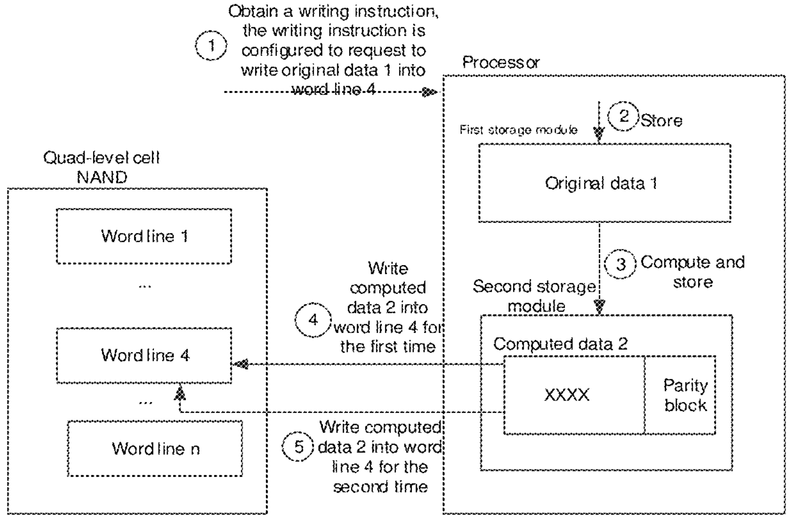
FIG. 4 is a schematic diagram of an architecture of writing data according to an embodiment of the present application.

FIG. 4 is a schematic diagram of an optional architecture of writing data according to an embodiment of the present application. As shown in FIG. 4, the processor may include, but is not limited to, a first storage module and a second storage module. The first storage module and the second storage module may include, but are not limited to, independent storage spaces in the processor. In an optional example, the processor may include, but is not limited to, a central processing unit (CPU). The first storage module may be configured to, but is not limited to, store original data to be processed and written into a word line. The second storage module may be configured to, but is not limited to, store data obtained after the processor computes the original data. For example, the first storage module includes a double data rate (DDR) memory, a synchronous dynamic random access memory (SRAM), a RAM, or the like. The second storage module includes a DDR, an SRAM, a RAM, or the like. The data obtained after the processor computes the original data may include, but is not limited to, a parity block. The parity block may be configured to, but is not limited to, verify whether the data obtained after computing the original data is accurate.

A quad-level cell (QLC) NAND is a NAND technology applied to a storage device. In the NAND, each cell may store different levels of charges, and store data by changing a state of charges in the cell, thereby storing different amounts of bit information. A characteristic of the QLC NAND is that each cell may store 4 bits of information. Compared with a single-level cell (SLC) NAND, a multi-level cell (MLC) NAND, and a TCL NAND, the QLC NAND has a greater storage density. A storage density is a number of bits of data allowed to be stored in each cell of a cell NAND. For example, each cell of the QLC NAND stores 4 bits of data (i.e., 00, 01, 10, 11), each cell of the SLC NAND stores 1 bit of data, each cell of the MLC NAND stores 2 bits of data, and each cell of the TCL NAND stores 3 bits of data.

The QLC NAND includes a storage region for storing data, and a portion of the storage region in the QLC NAND is divided as a word line. For example, the storage region in the QLC NAND is divided into word lines from 1 to n, n being a positive integer greater than or equal to 1. Each word line may include, but is not limited to, a storage region with the same size in the QLC NAND. For example, in a case where the QLC NAND includes a storage region of 20 MB, each word line may include, but is not limited to, a storage region of 48 K out of 20 MB. A word line includes one or more storage cells.

A target word line includes a word line in the QLC NAND into which data to be written needs to be written. For example, the storage region in the QLC NAND is divided into word lines from 1 to n. The target word line is the word line 4 among word lines from 1 to n. The method of writing data in the embodiments of the present application may be implemented through the following steps, but not limited to:

Step I: Obtain a writing instruction, wherein the writing instruction is configured to request to write original data 1 into word line 4.

Step II: The processor may, but is not limited to, first store original data 1 into the first storage module.

Step III: The processor extracts original data 1 from the first storage module, performs computation on original data 1 to obtain computed data 2, and stores data 2 into the second storage module. Data 2 may include, but is not limited to, a parity block. For example, the processor may, encrypt original data 1 according to, but not limited to, an encryption algorithm, to obtain data 2. For example, the encryption algorithm may include, but is not limited to, an XOR algorithm.

It should be noted that original data 1 may not be allowed to be written into the QLC NAND. In this case, the processor may, but is not limited to, perform computation (e.g., encryption) on original data 1, so that the computed data 2 is allowed to be written into the QLC NAND.

Step Iv: Write Data 2 Into Word Line 4 for the First Time.

Step V: In a case where writing of data 1 to word line 4 is completed, write data 2 into word line 4 for the second time.

It should be noted that there may be a data writing error when data 2 is written into word line 4 for the first time. For example, a portion of data 2 before data 2 is written into word line 4 is 1. After data 2 is written into word line 4, data which is originally supposed be 1 becomes 2. In this case, data 2 may be, but not limited to, written again into word line 4 to ensure correctness of data. Moreover, in a case where data 2 is written into word line 4 for the second time, there is no need to perform computation on original data 1 again, which improves efficiency of data writing.

Figure 5:
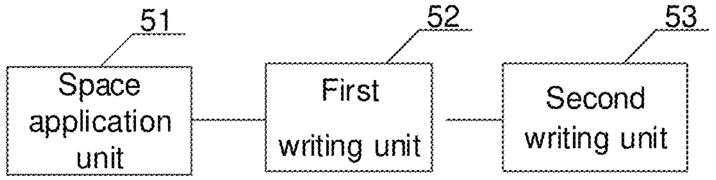
FIG. 5 is a schematic diagram of a system of writing data according to the present application.

In order to solve the above technical problems, the present application further provides a system of writing data. As shown in FIG. 5, the processor includes a first storage module and a second storage module. The processor is configured to write data into a quad-level cell NAND. The system includes:

a space application unit 51, configured to apply for a target storage space from the second storage module when the quad-level cell NAND is powered on, wherein the second storage module is a storage module independent of the first storage module;

a first writing unit 52, configured to compute a first parity block according to a data block that is written for the first time, transmit the first parity block and the data block that is written for the first time to a target word line, and store the first parity block into the target storage space, at a first time of writing to the target word line; and a second writing unit 53, configured to: call the first parity block in the target storage space, and transmit the first parity block and a data block that is written for a second time to the target word line, at a second time of writing to the target word line.

In an embodiment, when the processor is configured to process N writing operations concurrently, N is an integer greater than 2, the system further includes:

an identifier setting unit, configured to: divide computation resources of the processor into N parts, and set a corresponding sequence identifier for each part of the computation resources.

The space application unit 51 is configured to: apply for N target storage spaces from the second storage module when the quad-level cell NAND is powered on; and bind the N target storage spaces to the N parts of computation resources in a one-to-one correspondence.

In an embodiment, the system further includes:

an instruction obtaining unit, configured to: obtain a writing instruction, and determine, according to the writing instruction, whether it is the first time of writing to the target word line or it is the second time of writing to the target word line;

if it is determined that it is the first time of writing to the target word line, a signal is transmitted to the first writing unit 52; and if it is determined that it is the second time of writing to the target word line, a signal is transmitted to the second writing unit 53.

In an embodiment, the first writing unit 52 includes:

a space determining unit, configured to determine a target sequence identifier and a target storage space corresponding to the target sequence identifier according to the writing instruction;

an enable setting unit, configured to: apply for a target computation resource corresponding to the target sequence identifier, and set the target computation resource to an enable state;

a first computation unit, configured to: compute the first parity block by using the target computation resource in the enable state according to the data block that is written for the first time; and a first storage unit, configured to store the first parity block into the target storage space corresponding to the target sequence identifier.

In an embodiment, the second writing unit 53 includes:

a space determining unit, configured to determine a target sequence identifier and the target storage space corresponding to the target sequence identifier according to the writing instruction;

a disable setting unit, configured to set the target computation resource corresponding to the target sequence identifier to a disable state;

a reading unit, configured to read the first parity block from the target storage space corresponding to the target sequence identifier; and a third writing unit, configured to transmit the first parity block and the data block that is written for the second time to the target word line.

In an embodiment, the system further includes:

a first determining unit, configured to determine, at the first time of writing to the target word line, whether a process of storing the first parity block into the target storage space corresponding to the target sequence identifier is completed; and a first execution unit, configured to be connected to the disable setting unit if it is determined that the process of storing the first parity block into the target storage space corresponding to the target sequence identifier is completed; and a first releasing unit, configured to release the target sequence identifier.

In an embodiment, the first releasing unit is configured to mark the target sequence identifier as an unallocated state.

In an embodiment, the space determining unit is configured to determine a target sequence identifier that is unoccupied and a target address of the target storage space corresponding to the target sequence identifier according to the writing instruction.

In an embodiment, the second writing unit 53 includes:

a space determining unit, configured to determine a target sequence identifier and a target storage space corresponding to the target sequence identifier according to the writing instruction;

an enable setting unit, configured to apply for a target computation resource corresponding to the target sequence identifier, and set the target computation resource to an enable state;

a second computation unit, configured to compute the second parity block by using the target computation resource in the enable state according to the data block that is written for the second time;

a reading unit, configured to read the first parity block from the target storage space corresponding to the target sequence identifier; and a fourth writing unit, configured to transmit the first parity block or the second parity block, and the data block that is written for the second time to the target word line.

In an embodiment, the fourth writing unit is configured to determine a target parity block in a preset manner according to the first parity block and the second parity block, and transmit the data block that is written for the second time and the target parity block to the target word line.

In an embodiment, the fourth writing unit is configured to determine the target parity block according to a comparison result between data bits in the first parity block and data bits in the second parity block, and transmit the data block that is written for the second time and the target parity block to the target word line.

In an embodiment, the fourth writing unit is configured to determine a parity block with a correct computation result according to the data bits in the first parity block and the data bits in the second parity block, and transmit the parity block with the correct computation result and the data block that is written for the second time to the target word line.

In an embodiment, the system further includes:

a second determining unit, configured to determine whether the first parity block is the same as the second parity block;

a second execution unit, configured to transmit the data block that is written for the second time, and any one of the first parity block and the second parity block to the target word line, if it is determined that the first parity block is the same as the second parity block; and a third execution unit, configured to be connected to the fourth writing unit, if it is determined that the first parity block is not the same as the second parity block.

In an embodiment, the system further includes:

an error feedback unit, configured to feed back computation error information, if it is determined that both the first parity block and the second parity block are incorrect parity blocks.

In an embodiment, the system further includes:

a space clearing unit, configured to mark a space, which stores the first parity block, in the target storage space, as invalid and clear the space out.

In an embodiment, the system further includes:

a rewriting unit, configured to, when a preset condition is satisfied, write a data block into the target word line, to compute a third parity block according to the data block currently written, and transmit the third parity block and the data block to the target word line.

In an embodiment, the system further includes:

a space releasing unit, configured to release a space, which stores the first parity block, in the target storage space.

In an embodiment, the space releasing unit is configured to mark the space, which stores the first parity block, in the target storage space, as invalid and clear the space out.

In an embodiment, the system further includes:

a third determining unit, configured to determine whether transmission completion information fed back by the target word line is received; and a fourth execution unit, configured to be connected to the space releasing unit when the transmission completion information is received.

Description of the system of writing data may refer to the above embodiments, which will not be detailed herein.

Figure 6:
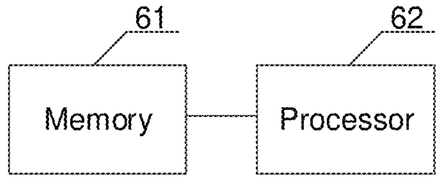
FIG. 6 is a schematic diagram of an apparatus of writing data according to the present application.

In order to solve the above technical problems, the present application further provides an apparatus of writing data, as shown in FIG. 6, the apparatus includes:

A memory 61, configured to store a computer program; and a processor 62, configured to implement, when executing the computer program, the steps of the method of writing data as described above.

Description of the apparatus of writing data may refer to the above embodiments, which will not be detailed herein.

Figure 7:
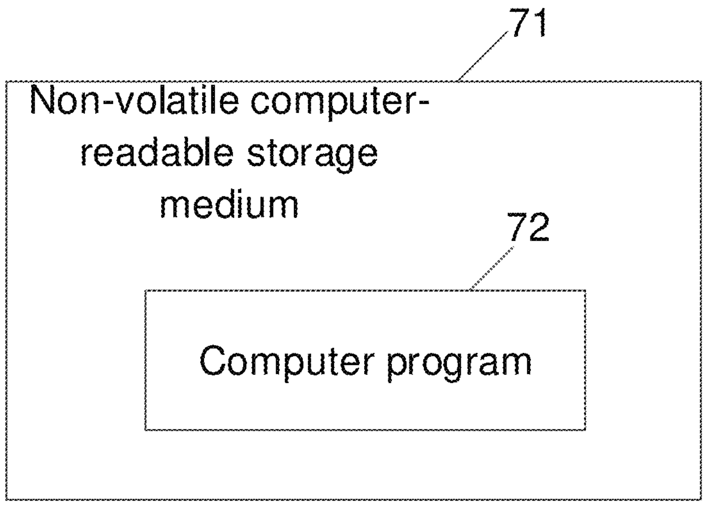
FIG. 7 is a schematic diagram of a non-volatile computer-readable storage medium according to the present application.

In order to solve the above technical problems, the present application further provides a non-volatile computer-readable storage medium 71, as shown in FIG. 7, having a computer program 72 stored thereon. The computer program 72, when executed by a processor, implements the steps of the method of writing data as described above.

Description of the non-volatile computer-readable storage medium may refer to the above embodiments, which will not be detailed herein.

In order to solve the above technical problems, the present application further provides a quad-level cell NAND. A processor includes a first storage module and a second storage module. The processor of the above apparatus of writing data is configured to write data into the quad-level cell NAND. Description of the quad-level cell NAND may refer to the above embodiments, which will not be detailed herein.

It should be noted that in this specification, relationship terms such as "first" and "second" are used only to distinguish one entity or operation from another entity or operation without necessarily requiring or implying any actual such relationship or order between these entities or operations. Furthermore, the terms "include", "including", or any other variation thereof, are intended to encompass a non-exclusive inclusion, such that a process, a method, an article, or a device that includes a list of elements not only includes these elements, but also includes other elements not explicitly listed or elements inherent to the process, method, article, or device. Without more constraints, an element limited by "includes a . . . " does not preclude the existence of additional identical elements in the process, method, product, or device that includes the element.

The above explanations of the disclosed embodiments enable those skilled in the art to implement or use the present application. Various modifications to these embodiments will be apparent to those skilled in the art, and the general principles defined herein can be implemented in other embodiments without departing from the spirit or scope of the present application. Thus, the present application is not limited to these embodiments shown herein, but accords with the broadest scope consistent with the principles and novel features disclosed herein.

The invention claimed is:

1. A method of writing data, applied to a processor, wherein the processor comprises a first storage module and a second storage module; the processor is configured to write data into a quad-level cell NAND; and the method comprises:

applying for a target storage space from the second storage module when the quad-level cell NAND is powered on, the second storage module being a storage module independent of the first storage module;

computing a first parity block according to a data block that is written for a first time, transmitting the first parity block and the data block that is written for the first time to a target word line, and storing the first parity block into the target storage space, at a first time of writing to the target word line; and calling the first parity block in the target storage space, and transmitting the first parity block and a data block that is written for a second time to the target word line, at a second time of writing to the target word line.

2. The method according to claim 1, wherein when the processor is configured to process N writing operations concurrently, N is an integer greater than 2, the method further comprises:

dividing computation resources of the processor into N parts, and setting a corresponding sequence identifier for each part of the computation resources; and the applying for a target storage space from the second storage module when the quad-level cell NAND is powered on comprises:

applying for N target storage spaces from the second storage module when the quad-level cell NAND is powered on; and binding the N target storage spaces to the N parts of the computation resources in a one-to-one correspondence.

3. The method according to claim 2, further comprising:

obtaining a writing instruction, and determining, according to the writing instruction, whether it is the first time of writing to the target word line or it is the second time of writing to the target word line;

if it is determined that it is the first time of writing to the target word line, proceeding to a step of the computing a first parity block according to a data block that is written for a first time, transmitting the first parity block and the data block that is written for the first time to a target word line, and storing the first parity block into the target storage space, at a first time of writing to the target word line; and if it is determined that it is the second time of writing to the target word line, proceeding to a step of the calling the first parity block in the target storage space, and transmitting the first parity block and a data block that is written for a second time to the target word line, at a second time of writing to the target word line.

4. The method according to claim 3, wherein the computing a first parity block according to a data block that is written for a first time, transmitting the first parity block and the data block that is written for the first time to a target word line, and storing the first parity block into the target storage space, at a first time of writing to the target word line, comprises:

determining a target sequence identifier and the target storage space corresponding to the target sequence identifier according to the writing instruction;

applying for a target computation resource corresponding to the target sequence identifier, and setting a parity computation flag bit to an enable state;

computing the first parity block by using the target computation resource according to the data block that is written for the first time; and storing the first parity block into the target storage space corresponding to the target sequence identifier; or setting a parity computation flag bit to an enable state according to the writing instruction, applying for the target storage space and a target computation resource, computing the first parity block by using the target computation resource according to the data block that is written for the first time, and storing the first parity block into the target storage space.

5. The method according to claim 4, wherein the determining a target sequence identifier and a target storage space corresponding to the target sequence identifier according to the writing instruction comprises:

determining a target sequence identifier that is unoccupied and a target address of the target storage space corresponding to the target sequence identifier according to the writing instruction.

6. The method according to claim 3, wherein the calling the first parity block in the target storage space, and transmitting the first parity block and a data block that is written for a second time to the target word line, at a second time of writing to the target word line, comprises:

determining a target sequence identifier and the target storage space corresponding to the target sequence identifier according to the writing instruction, and setting a parity computation flag bit to a disable state;

reading the first parity block from the target storage space corresponding to the target sequence identifier; and transmitting the first parity block and the data block that is written for the second time to the target word line.

7. The method according to claim 6, further comprising:

determining, at the first time of writing to the target word line, whether a process of storing the first parity block into the target storage space corresponding to the target sequence identifier is completed; and releasing the target sequence identifier if it is determined that the process of storing the first parity block into the target storage space corresponding to the target sequence identifier is completed.

8. The method according to claim 7, wherein the releasing the target sequence identifier comprises:

marking the target sequence identifier as an unallocated state.

9. The method according to claim 3, wherein the calling the first parity block in the target storage space, and transmitting the first parity block and a data block that is written for a second time to the target word line, at a second time of writing to the target word line, comprises:

determining a target sequence identifier and the target storage space corresponding to the target sequence identifier according to the writing instruction;

applying for a target computation resource corresponding to the target sequence identifier, and setting a parity computation flag bit to an enable state;

computing a second parity block by using the target computation resource according to the data block that is written for the second time;

reading the first parity block from the target storage space corresponding to the target sequence identifier; and transmitting the first parity block or the second parity block, and the data block that is written for the second time to the target word line.

10. The method according to claim 9, wherein the transmitting the first parity block or the second parity block, and the data block that is written for the second time to the target word line comprises:

determining a target parity block in a preset manner according to the first parity block and the second parity block, and transmitting the data block that is written for the second time and the target parity block to the target word line.

11. The method according to claim 10, wherein the determining a target parity block in a preset manner according to the first parity block and the second parity block, and transmitting the data block that is written for the second time and the target parity block to the target word line comprises:

determining the target parity block according to a comparison result between data bits in the first parity block and data bits in the second parity block, and transmitting the data block that is written for the second time and the target parity block to the target word line.

12. The method according to claim 11, wherein the determining the target parity block according to a comparison result between data bits in the first parity block and data bits in the second parity block, and transmitting the data block that is written for the second time and the target parity block to the target word line comprises:

determining a parity block with a correct computation result according to the data bits in the first parity block and the data bits in the second parity block, and transmitting the parity block with the correct computation result and the data block that is written for the second time to the target word line.

13. The method according to claim 12, wherein before the determining a parity block with a correct computation result according to the data bits in the first parity block and the data bits in the second parity block, and transmitting the parity block with the correct computation result and the data block that is written for the second time to the target word line, the method further comprises:

determining whether the first parity block is the same as the second parity block;

if it is determined that the first parity block is the same as the second parity block, transmitting the data block that is written for the second time, and any one of the first parity block and the second parity block to the target word line; and if it is determined that the first parity block is not the same as the second parity block, proceeding to a step of the determining a parity block with a correct computation result according to the data bits in the first parity block and the data bits in the second parity block, and transmitting the parity block with the correct computation result and the data block that is written for the second time to the target word line.

14. The method according to claim 12, wherein after the determining a parity block with a correct computation result according to the data bits in the first parity block and the data bits in the second parity block, the method further comprises:

if both the first parity block and the second parity block are incorrect parity blocks, feeding back computation error information.

15. The method according to claim 14, wherein after the feeding back computation error information, the method further comprises:

marking a space, which stores the first parity block, in the target storage space, as invalid and clearing the space out; or when a preset condition is satisfied, writing a data block into the target word line, to compute a third parity block according to the data block currently written, and transmitting the third parity block and the data block to the target word line.

16. The method according to claim 15, wherein after the calling the first parity block in the target storage space, and transmitting the first parity block and a data block that is written for a second time to the target word line, at a second time of writing to the target word line, the method further comprises:

releasing the space, which stores the first parity block, in the target storage space.

17. The method according to claim 3, wherein the calling the first parity block in the target storage space, and transmitting the first parity block and a data block that is written for a second time to the target word line, comprises:

setting a parity computation flag bit to a disable state according to the writing instruction, reading the first parity block from the target storage space, and transmitting the first parity block and the data block that is written for the second time to the target word line.

18. A system of writing data, applied to a processor, wherein the processor comprises a first storage module and a second storage module; the processor is configured to write data into a quad-level cell NAND; and the system comprises:

a space application unit, configured to apply for a target storage space from the second storage module when the quad-level cell NAND is powered on, wherein the second storage module is a storage module independent of the first storage module;

a first writing unit, configured to: compute a first parity block according to a data block that is written for a first time, transmit the first parity block and the data block that is written for the first time to a target word line, and store the first parity block into the target storage space, at a first time of writing to the target word line; and a second writing unit, configured to: call the first parity block in the target storage space, and transmit the first parity block and a data block that is written for a second time to the target word line, at a second time of writing to the target word line.

19. An apparatus of writing data, comprising: a memory, configured to store a computer program; and a processor, configured to implement, when executing the computer program, a method of writing data, wherein the processor comprises a first storage module and a second storage module; the processor is configured to write data into a quad-level cell NAND; and the method comprises: applying for a target storage space from the second storage module when the quad-level cell NAND is powered on, the second storage module being a storage module independent of the first storage module; computing a first parity block according to a data block that is written for a first time, transmitting the first parity block and the data block that is written for the first time to a target word line, and storing the first parity block into the target storage space, at a first time of writing to the target word line; and calling the first parity block in the target storage space, and transmitting the first parity block and a data block that is written for a second time to the target word line, at a second time of writing to the target word line.

20. A non-transitory non-volatile computer-readable storage medium, having a computer program stored thereon, wherein the computer program, when executed by a processor, implements a method of writing data, wherein the processor comprises a first storage module and a second storage module; the processor is configured to write data into a quad-level cell NAND; and the method comprises: applying for a target storage space from the second storage module when the quad-level cell NAND is powered on, the second storage module being a storage module independent of the first storage module; computing a first parity block according to a data block that is written for a first time, transmitting the first parity block and the data block that is written for the first time to a target word line, and storing the first parity block into the target storage space, at a first time of writing to the target word line; and calling the first parity block in the target storage space, and transmitting the first parity block and a data block that is written for a second time to the target word line, at a second time of writing to the target word line.

* * * * *